United States Patent [19]
Pelletier

[11] 3,949,111
[45] Apr. 6, 1976

[54] FUSION BONDED NON-WOVEN FABRIC

[76] Inventor: Jacques Pelletier, Le Tremblay, 69810 Albigny-sur-Saone, France

[22] Filed: Dec. 3, 1973

[21] Appl. No.: 421,168

[30] Foreign Application Priority Data
Dec. 1, 1972  France .............................. 72.43466

[52] U.S. Cl. ................ 428/109; 156/178; 156/181; 156/273; 156/296; 156/436; 156/441; 156/581; 156/380; 428/107; 428/198; 428/232; 428/288; 428/296; 428/294

[51] Int. Cl.² ... B32B 5/12; B32B 5/26; D04H 3/04; D04H 3/14

[58] Field of Search .......... 161/55, 57, 58, 60, 109, 161/112, 113, 143, 146, 147, 157, DIG. 6; 156/181, 178, 272, 273, 296, 436, 441, 581, 380; 428/105, 107, 109, 112, 113, 232, 288, 296, 198, 294

[56] References Cited
UNITED STATES PATENTS

| | | | |
|---|---|---|---|
| 2,266,761 | 12/1941 | Jackson, Jr. et al. ................ | 428/107 |
| 2,767,941 | 10/1956 | Gegner et al. ....................... | 161/147 |
| 2,902,395 | 9/1959 | Hirschy et al. ....................... | 428/109 |
| 3,255,065 | 6/1966 | Wyckoff ......................... | 161/DIG. 6 |
| 3,556,918 | 1/1971 | Lemelson ............................. | 161/60 |
| 3,607,564 | 9/1971 | Rasko ................................. | 156/181 |
| 3,759,782 | 9/1973 | Bleuer ............................. | 161/DIG. 6 |
| 3,844,874 | 10/1974 | Nalle, Jr. ......................... | 161/DIG. 6 |

FOREIGN PATENTS OR APPLICATIONS
1,092,373  11/1967  United Kingdom

OTHER PUBLICATIONS
Fruehauf, application Serial No. 260,824, filed June 8, 1972, laid open to public inspection on Apr. 3, 1973 as noted at 909 O.G. 7, Drawings and Claims, U.S. Class 161/109 as evidenced by Def. Pub. Search Copy of said application published at 909 O.G. 7 on Apr. 3, 1973, Def. Pub. No. T909,008.

Primary Examiner—George F. Lesmes
Assistant Examiner—Charles E. Lipsey
Attorney, Agent, or Firm—Michael J. Striker

[57] ABSTRACT

A fabric, a method for its fabrication and an apparatus for its manufacture where a group of parallel yarns are fused with another group of parallel yarns perpendicular to the first group of yarns at predominantly lateral or peripheral portions of the resulting junctions by a high frequency current.

4 Claims, 8 Drawing Figures

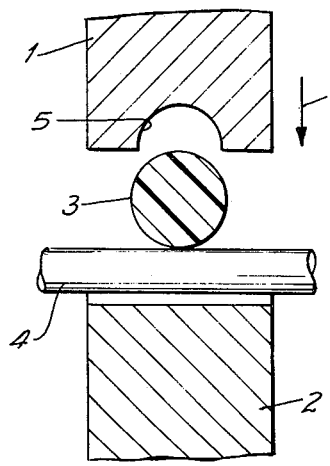
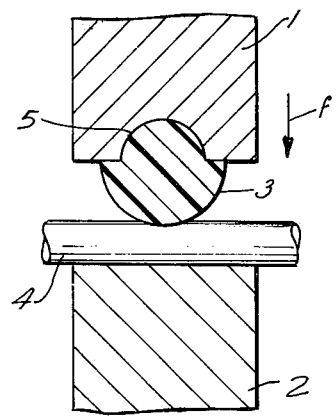
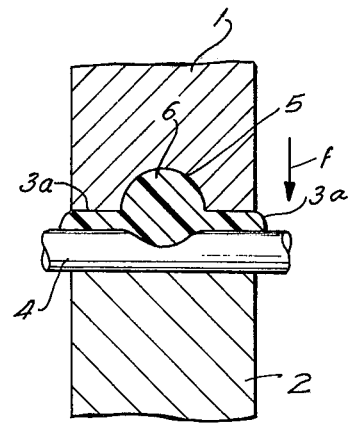
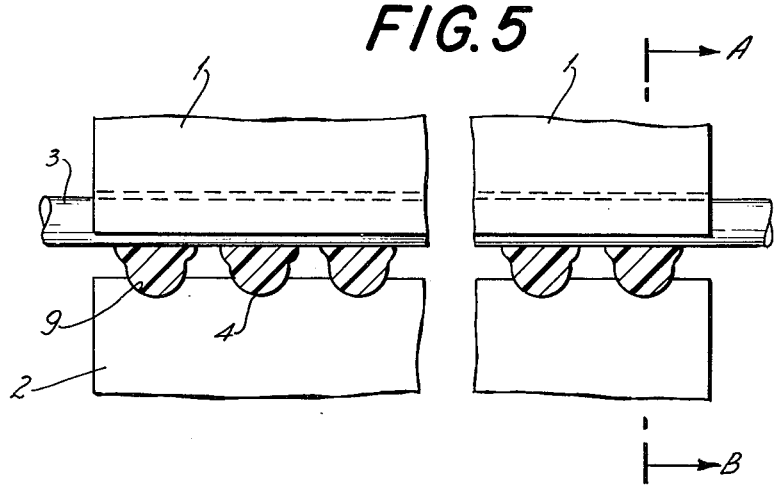
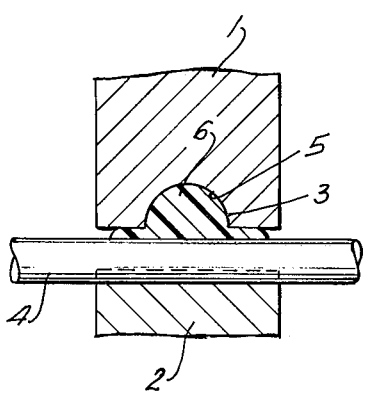

FUSION BONDED NON-WOVEN FABRIC

BACKGROUND OF THE INVENTION

This invention relates to a textile fabric and a method and apparatus for the manufacture of the fabric.

It is well known that it is possible to manufacture fabrics such as cloth, non-woven fabrics, knit goods, felt and others made up of continuous yarns or non-continuous yarns, or of a mixture of the two, and in which the cohesion of the fabric is improved by a fusion of certain of their yarns at their crossing points. (French Pat. Nos. 987,652, 1,453,289 and 1,579,042).

It is also known that this fusion can be effected by subjecting these fibers or yarns to a high frequency field where certain of these yarns or fibers made of a thermoplastic material are fused together by means of that high frequency electric field. (British Pat. No. 591633, German Fed. Republic Pat. No. 1,818,582, U.S. Pat. No. 2,467,282).

Fabrics are also known where some fibers or yarns are fused at their crossing points with the aid of a thermoplastic film, and where the junction at these crossing points is achieved by means of a high frequency current. (French Pat. No. 1,522,152).

Known fabrics which have portions of their yarns fused by means of a high frequency electric current exhibit, however certain disadvantages, particularly the following:

The fusion process is always accompanied by a certain hardening of the yarns at the fused points and, therefore a fabric of a somewhat reduced flexibility is obtained which shows a relatively high rigidity at the junction of the yarns.

Furthermore, during the fusion process, and in order to obtain an optimum effect, it is necessary to reduce the distance between the electrodes to a minimum, which results in a significant compression of the fabric.

After the completed fusion process one therefore obtains a cloth which is somewhat flattened at the crossing points of the yarns and this is disadvantageous since the touch and appearance of the fabric is thereby detrimentally affected.

The invention herein described seeks to obviate these disadvantages.

SUMMARY OF THE INVENTION

A fabric, a method of fabricating the fabric, and an apparatus for the manufacture of the fabric, where the lateral or peripheral portions of one group of parallel yarns form crossing points with a second group of parallel yarns; predominantly only the lateral or peripheral portions of the yarns at these crossing points are joined by a high frequency electric field, causing heating, and subsequent fusion as a result of dielectric losses in the yarns to yield a fabric of high flexibility.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1, 2 and 3 show in fragmentary elevation three successive positions of two electrodes with crossed yarns therebetween;

FIG. 4 shows in a cross section taken along lines A-B of FIG. 5 two electrodes in their juxtaposed position with interposed yarns in another embodiment of the invention;

FIG. 5 shows a fragmentary elevation view corresponding to FIG. 4.

DESCRIPTION OF PREFERRED EMBODIMENTS

The present invention relates to a fabric in which two groups of substantially parallel yarns of thermoplastic material are superimposed and crossed transversely with each other substantially in a plane, forming a plurality of crossing points. At least one group of these yarns is compressed at these crossing points so that lateral portions of smaller thickness than the remainder of the yarns are formed. The portions of smaller thickness are in contact with portions of the second group of yarns, while both groups of yarns are under compression. A high frequency electric field is then applied to these superimposed yarns under compression. This results in a fusion of substantially only the lateral portions of smaller thickness of one group of yarns to portions of the other group of yarns.

The apparatus for the manufacture of the fabric uses at least two electrodes, at least one electrode being provided with appropriate grooves or cavities adapted to make contact with yarns at least at the crossing points of yarns transverse to each other prior to compression of these yarns at the crossing points. The peripheral or lateral portions of these yarns squeezed out from the center of the yarn as a result of the compression process diminishes the thickness of these portions as compared to the central portions; the resulting junctions then lie on a surface different from that of the remaining substantially parallel portions of these yarns.

One of the objects of fusing crossing yarns at their peripheral or lateral points is to avoid to a large degree the stiffening of the fabric due to such fusion.

Figure 7:
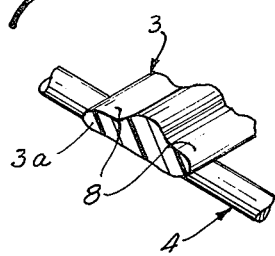
FIG. 7 shows a perspective view of a fused junction obtained between two transverse yarns.
Figure 8:
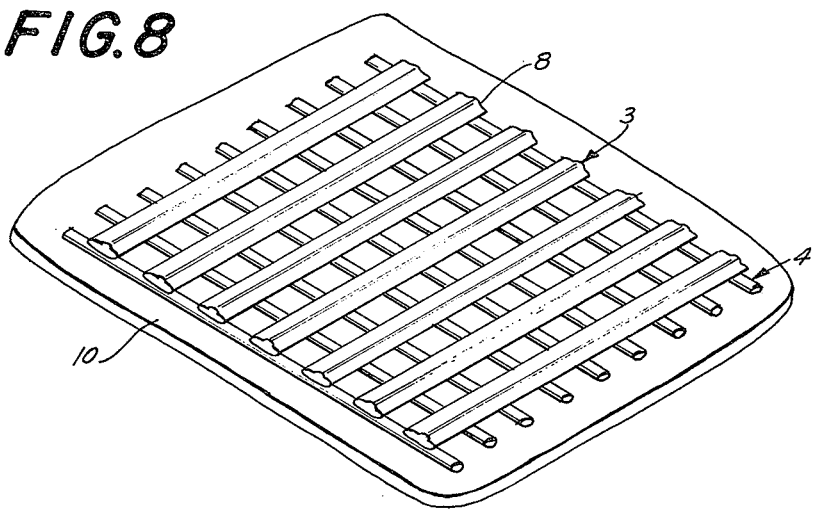
FIG. 8 shows a perspective view of a fabric made additionally with an underlying thermoplastic sheet.

As shown in FIGS. 1, 2 and 3, the movable top electrode 1 cooperates with its stationary counterpart, electrode 2, the latter being in axial alignment with electrode 1, transverse yarns being interposed between the two electrodes. The electrodes are moved towards each other in the direction of the arrow $f$ shown in FIG. 1 from a first position, where the electrodes are separated from each other, to a second position, where the interposed yarns are forced together by the electrodes. Electrode 1 has a face formed with a longitudinal groove 5 of semi-circular shape and of a radius of curvature which is smaller than one-half the mean diameter of the adjacent yarn. Electrode 2 has a face parallel to the face of electrode 1. The top portion 6 of the yarn 3 closest to electrode 1 is located in groove 5 of that electrode, and parts of that top portion are squeezed out at the crossing points of the yarns 3, 4 to form lateral portions 3a of smaller thickness than remainder thereof at the crossing points as a result of the compressive action of these electrodes, as shown in FIG. 7.

A high frequency electric current passed through the first electrode 1, both crossed yarns 3, 4 and through the second electrode 2 will take the path of least resistance and therefore pass mainly through the lateral portions 3a of smallest thickness of the yarn 3 in contact with the other yarn 4. This current will cause dielectric losses in these yarns, and a consequent heating of these yarns, which will result in a fusion of the predominantly lateral portions of one yarn to the crossing yarn.

It is also possible to provide both electrodes 1 and 2 with grooves, as shown in FIGS. 4 and 5. In particular, electrode 2 will be seen to be formed with multiple grooves 9. When the electrodes are moved together, the top portion 6 of yarn 3, which is closest to electrode 1 will, as before, be located in groove 5 of that electrode, but in addition the bottom portions of yarns 4, which is closest to electrode 2, will be located in grooves 9 of that electrode. When electrodes 1 and 2 are moved towards each other and compress the interposed yarns, parts of the top portions of the yarn closest to electrode 1 will be squeezed out at the crossing points of the yarns to form lateral portions of smaller thickness than the remainder thereof in a substantially identical fashion as has been described above, but in addition parts of the bottom portion of the yarn closest to electrode 2 will also be squeezed out to form lateral portions substantially similar to those of the yarn closest to electrode 1, the respective lateral portions of the yarn closest to electrode 1, and the yarn closest to electrode 2 being substantially perpendicular to each other.

Figure 6:
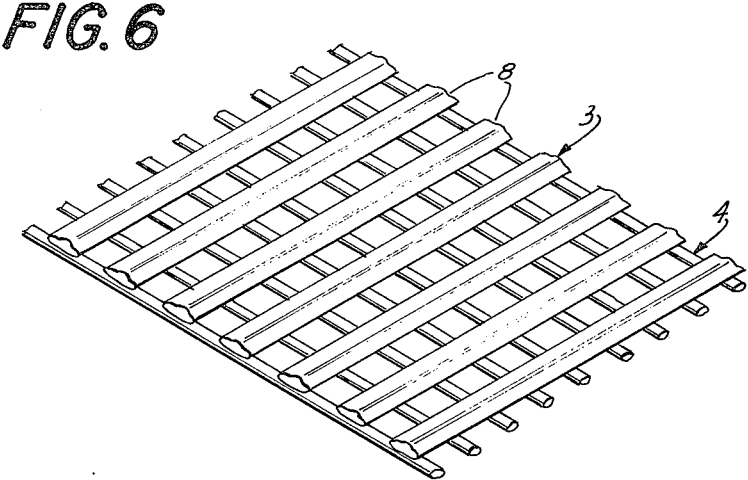
FIG. 6 shows a perspective view of a fabric made according to the process of the present invention.

FIG. 6 shows a perspective view of a fabric which has been successively subjected to the steps shown in FIGS. 1, 2 and 3.

FIG. 7 shows a perspective view of a fused junction obtained between two transverse yarns 3 and 4 respectively, 8 denoting intersections of peripheral or lateral portions of yarns of smallest width.

In an apparatus of the type described, the following materials can preferably be interposed between the electrodes:

Yarns NM. 1500, count transverse to the cross-section of the electrodes as shown in FIGS. 1 to 4, composed in weight of approximately 80% of chlorofibers, trade-mark CLEVYL, and 20% viscose fibers of about 20 millimeters length.

Yarns running longitudinally and parallel to the faces of the electrodes as shown in FIGS. 1 to 4 have the same composition.

The diameter of said groove 5 being lesser than about 20% to the diameter of the yarns.

The fabric is preferably made up of two yarns per centimeter in both longitudinal and cross-wise directions.

During the manufacturing process the two groups of superimposed and crossed yarns will be intermittently moved through the gap between the electrodes, when the electrodes are in the first position, and spaced further from each other, in a direction along the longitudinal axis of yarn 3, for example as shown in FIG. 5, from left to right. To effect fusion, the motion of the yarns is stopped, so that one group of cross-wise yarns 4 together with a portion of longitudinal yarn 3 will be interposed between the electrodes. The electrodes are then moved from the first position to a second position, where they engage the interposed yarns with a force of approximately 250 kilograms per meter of electrode length, length being measured along the longitudinal portion of the electrode face, i.e., parallel to the axis of yarn 3. Parts of both yarn 3 and parts of yarn 4 are squeezed out by the compressive force exerted by the electrodes, as has been described above, to form lateral portions of smallest thickness. An electric current at a frequency of approximately 27 Megahertz, furnished by a power generator and supplying energy at a power of approximately 1 kilowatt per meter of electrode length is passed through the electrodes and the interposed yarns. Because of the close proximity of the parallel faces of the electrodes the current will take the path of least resistance, as has been described before, and will pass predominantly through the lateral portions of both yarn 3 and yarns 4, fusing together predominantly the lateral portions of these yarns.

The current flow is maintained for about 1.5 seconds; the electrodes are subsequently separated and the motion of the yarns restarted until the next group of cross-wise yarns 4 if interposed between these electrodes and the whole cycle is restarted again.

The example shown is only illustrative; the composition of the yarns, the space between the yarns in both longitudinal and cross-wise directions can vary to a large degree, and so can the results which one desires to obtain.

The above examples have illustrated electrodes where one or the other electrode, or both electrodes, were provided with grooves; in some cases it is sufficient to use electrodes formed with simple indentations or cavities, these indentations squeezing out similar lateral portions of smallest thickness of the interposed yarns when the electrodes engage the interposed yarns and compress the latter. The current passing through these electrodes following their engagement with these yarns results again in fusion taking place predominantly at the lateral portions of these yarns.

Arrangements of electrodes in an apparatus for fusion of yarns by high frequency current at their junction points using grooves or designs in the form of zig-zags, triangles, or similar shapes are also known (Luxemburg Pat. No. 46,540) but these are used essentially for decorative purposes, for example to give the material a touch of imitation velvet. The present invention, however, accomplishes fusion primarily at the lateral or peripheral portions of yarns, in a manner sufficient to ensure fusion of yarns, but without affecting the touch, or any other aspect of the fabric's quality detrimentally.

As has been explained already, fabrics suitable for use along the lines of this invention must employ fibers containing a high degree of thermoplastic material. Materials of this kind are, for example, polyvinyl chloride fibers (chlorofibers), polyamides, polyesters, polyacrylic fibers, and cellulose of acetate fibers.

Non-thermoplastic fibers which can be blended with the preceding fibers are, in particular cotton, wool and viscose.

The fabrication, for example, of a fabric using pluralities of yarns superimposed upon each other and fused at their crossing point, has been described above. The invention is, however, not limited to this embodiment only. In one embodiment in particular, for example in order to increase the opaqueness of the fabric, or to obtain a velvet effect, it is possible to place one or a plurality of warp threads between two weft threads.

It is equally possible to form complex materials by placing the constituent yarns directly or indirectly in contact with a support sheet of non-woven fabric or conventional cloth, also made of thermoplastic or thermally fusable material, and fusing these materials together. It is also possible to form materials by an assembly of cut fibers, sandwiched between two sheets of longitudinal and cross-wise yarns, and fuse them together, according to the principles of this invention.

In another version of this invention, one can also fuse yarns which are colored or have a varied appearance by using as many electrodes as there are cross-wise running yarns.

Finally, if one so desires, it is also possible to achieve boucle effects. In order to achieve this, one fabricates first two sheets of intertwined fibers, the resultant material being thermally fused onto a base material. In one case, for example, the base material may be contracted by heat, and one then forms loops on the longitudinal yarns by shrinking the base fabric. In another case, one first fuses a yarn of the yarns running cross-wise onto parallel longitudinally running yarns, and subsequently supplies longitudinally running yarns of a length exceeding the length of yarns running cross-wise, forming them into a bulge to create the boucle effect of the base material; then one fuses them again onto a second yarn of cross-wise running yarns in a customary fashion so as to form the longitudinally running yarns in a boucle configuration, and then the whole operation is restarted again.

It is clear that if one desires to obtain a velvet, furry, carpet-like or other appearance of the fabric, it is possible to cut the boucles by any appropriate means.

The fabrics obtained along the lines of the invention can find applications in many diverse domains, such as clothing, furnishing, industrial usages and so forth.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fabric comprising a first plurality of parallel yarns and a second plurality of parallel yarns superimposed upon, and extending transverse to said first plurality of yarns, crossing said first plurality of yarns at a plurality of crossing points, said yarns being formed at least in part from thermoplastic material, the yarns of at least one of said plurality of yarns having longitudinal axes and, at least at said crossing points, lateral portions located laterally of said axes of a thickness smaller than the remaining central portions of said yarns; and autogenously fused joints connecting only said lateral portions of smaller thickness of said one plurality of yarns at said crossing points to said other plurality of yarns, wherein all of said yarns are selected from the group consisting of multi-filament and staple fiber yarns.

2. A fabric as set forth in claim 1, said first plurality of yarns being perpendicular to said second plurality of yarns, one said plurality of yarns corresponding to the warp of a conventional fabric, the other said plurality of yarns corresponding to the weft of said conventional fabric.

3. A fabric as set forth in claim 1, wherein said yarns of said at least one group of yarns have curved portions located on a surface distinct from that at which said fused joints are located.

4. A fabric as set forth in claim 1, said yarns being fused at said crossing points to each other and to a supporting thermoplastic material selected from a group of materials consisting of sheets, fabrics, and films.

* * * * *